Figure 1:
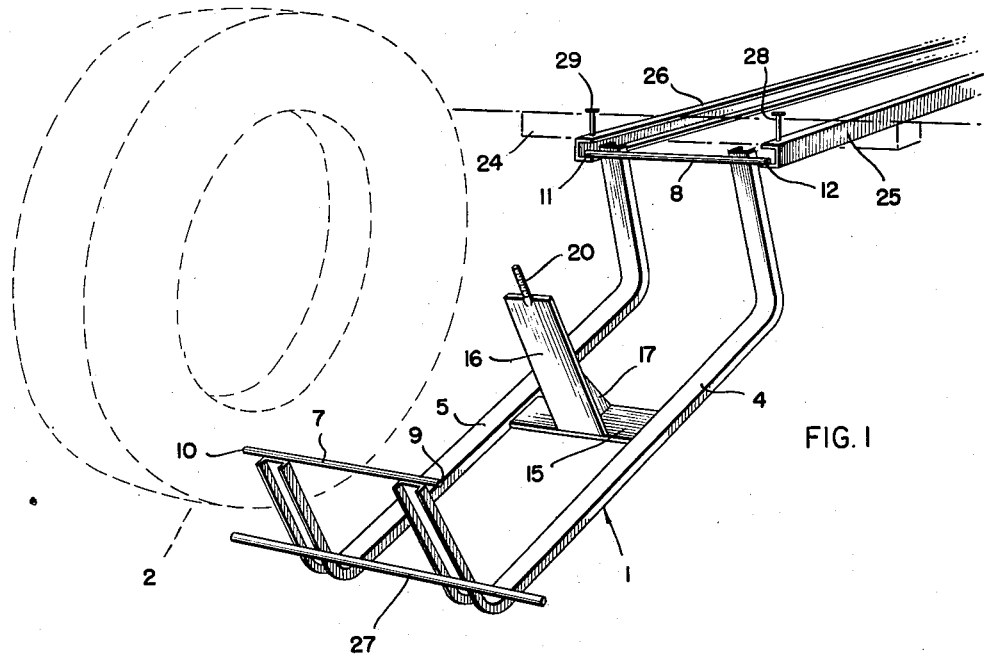

March 17, 1953  P. C. BROWN  2,631,764
TIRE AND WHEEL CARRIER
Filed Sept. 28, 1949

INVENTOR.
PAUL C. BROWN
BY
Arthur A. Smith
ATTORNEY

Patented Mar. 17, 1953

2,631,764

UNITED STATES PATENT OFFICE 2,631,764

TIRE AND WHEEL CARRIER

Paul C. Brown, Auburn, Ind.

Application September 28, 1949, Serial No. 118,251

4 Claims. (Cl. 224—42.23)

This invention relates generally to tire carriers and more particularly it relates to a wheel and tire carrier adapted for use on motor trucks.

Conventional tire carriers usually consist of a light frame made of strap iron and include ears of one sort or another, also made of strap iron, for fastening the tire carrier to the body structure of a truck.

Because of the light construction of conventional tire carriers, truck operators find that tires and wheels become unloosened from the tire carriers and are lost. Loss of wheels and tires also occurs because of the fact that the clamps conventionally used to fasten a tire into the carrier are unsafe and release the tire and wheel.

It is also a common complaint of truck operators that conventional tire carriers make it extremely difficult to remove a spare wheel and tire because they are usually strapped to the underbody of a truck and access, under some road and weather conditions, is almost impossible.

The primary object of this invention is to provide a tire carrier which holds a tire and wheel in a safe and positive manner.

Another object of this invention is to provide a tire and wheel carrier which can safely and securely be fastened to the underbody of a motor truck.

Still another object of this invention is to provide a tire and wheel carrier which may be moved out from under the body of a truck whereby there is easy access to the clamping structure and the tire and wheel.

A further object of this invention is to provide a tire and wheel carrier having a simple and positive mechanism for locking the carrier beneath the body of the truck.

In accordance with this invention, there is provided a tire carrier comprising a U-shaped cradle adapted to receive a tire mounted on a wheel, the cradle including studs projecting therefrom, a wheel-centering column mounted on the cradle to extend into engagement with the wheel, and a pair of rails adapted to receive the studs.

In accordance with another feature of this invention, there is provided a tire and wheel carrier comprising a cradle adapted to receive a tire mounted on a wheel, the cradle having projecting studs in a plane slightly above that of the tire and wheel, a wheel-centering member mounted on the cradle and extending into engagement with the wheel and approximately to the level of the studs, and a pair of rails adapted to receive the studs whereby the rails prevent movement of the wheel with respect to the column.

For a better understanding of the invention, together with other and further objects thereof, reference is made to the following description, taken in connection with the accompanying drawings, and its scope will be pointed out in the appended claims.

In the accompanying drawings:

Figure 1 of the drawings is a perspective view illustrating the tire and wheel carrier constructed in accordance with this invention and in position to allow removal of the tire and wheel from the carrier.

Figure 2:
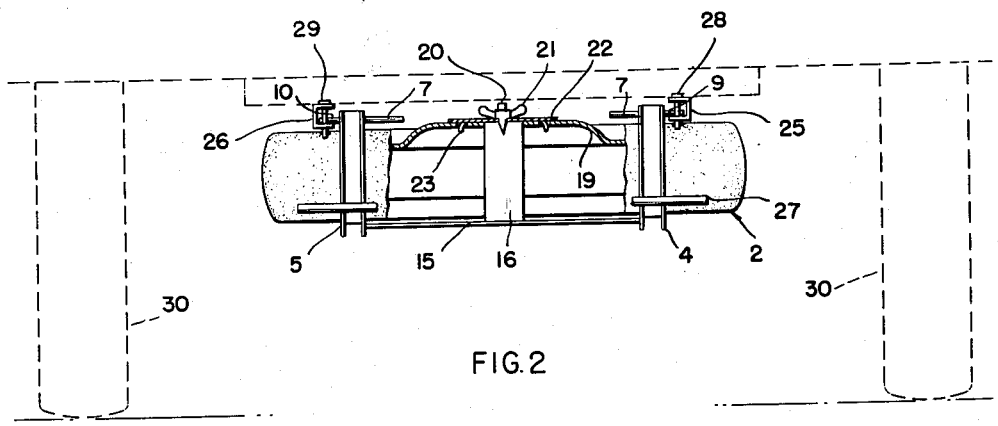

Figure 2 of the drawings is an end view illustrating the tire and wheel carrier in position to carry the wheel and tire beneath the body structure of a motor truck.

Referring to the drawings, there is provided in accordance with this invention, a U-shaped cradle 1 adapted to receive a tire and wheel 2. Cradle 1 consists of two, U-shaped, spaced, longitudinal stringers 4 and 5 which are tied together at the open ends by means of transverse tie-rods 7 and 8 which may be fixed to members 4 and 5 by welding, riveting, or other conventional means. Ends 9 and 10 of tie-rod 7 and ends 11 and 12 of tie-rod 8 project laterally beyond the outer edges of stringers 4 and 5 for a purpose which will be explained subsequently.

Across the mid-portion of cradle 1 there is welded, or otherwise fastened, a beam 15 to which is welded, or otherwise fastened, an upstanding wheel-centering column 16 and a brace 17 which is fixed between beam 15 and column 16 for the purpose of providing rigidity. Conventional motor truck wheels include a disc 19 having an aperture therein which allows the wheels to be mounted over the truck axle. Column 16 is provided with a stud-bolt 20 and wing-nut 21 which are adapted to engage with a disc engaging cap 22, the purpose of which is to engage disc 19 and clamp wheel 2 to the cradle 1. Cap 22 is provided with a plurality of ears 23 adapted to project through the bolt holes conventionally provided in truck wheels.

For receiving the ends 9, 10, 11, and 12 of tie-rods 7 and 8, there are provided channel rails 25 and 26 which may be fastened, in parallel relation to one another, to truck body 24 by bolts or other conventional means. When the wheel and tire have been mounted in cradle 1, the cradle may be lifted by handle 27 and pushed underneath the truck body 24 with the ends 9, 10, 11, and 12 of rods 7 and 8 on the rails as illustrated in Figure 2. The rails may have pins or bolts such as 28 and 29 in the way of the ends of tie-rods 7 and 8 at both the front and rear ends of cradle 1. Pins 28 and 29 serve as a positive locking means to prevent cradle 1 from sliding off the rails and removal of the pins allows the cradle to be withdrawn easily with respect to the rails. As illustrated in Figure 2 of the drawings, the tire and wheel carrier may be mounted between the truck wheels 30 and underneath the truck body 24.

From the foregoing description, it will be apparent that a tire and wheel carrier provided in accordance with this invention is adapted to hold, in a positive manner, a tire and wheel. The U-shaped cradle prevents movement of the tire and wheel in a longitudinal direction, while the column 16 prevents movement of the wheel in a lateral direction. It should also be noted that the cradle 1 and the column 16 are of such dimensions that the wheel and tire 2 are supported immediately beneath the rails 25 and 26 whereby there can be only very slight vertical movement of the wheel. Column 16 extends almost to the level of tie-rods 7 and 8 and, therefore, the wheel 2 cannot become disengaged from column 16 due to the fact that it cannot move vertically to an extent sufficient to disengage the disc 19 from column 16. Thus, the tire and wheel cannot move laterally even if the wing-nut 21 becomes loosened. The stud-bolt, wing-nut, and cap serve to clamp the wheel so that it will not rattle as well as to prevent the wheel from falling out of the tire carrier.

Another advantage of this invention is that the tire carrier may be conveniently withdrawn with respect to the underbody of the truck so that the truck operator may remove the wheel from the carrier without undue difficulty. Also, a simple but positive lock is provided in the form of pins 28 and 29 which prevents the carrier from moving off the rails 25 and 26.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A tire and wheel carrier comprising a cradle adapted to receive a wheel and tire mounted thereon, said cradle comprising a pair of U-shaped, longitudinal stringers for carrying said wheel and tire, a transverse tie-rod at each end of said cradle and having ends projecting laterally of said stringers, a beam fixed across the mid-portion of said cradle, a wheel-centering column mounted perpendicular to said beam to extend into engagement with the disc of said wheel for preventing lateral movement thereof, a clamping device fixed to the free end of said column and in engagement with said wheel for clamping said wheel, a pair of channel rails parallel to said stringers and adapted to receive said projecting ends of said tie-rods in sliding engagement and a pair of removable locking pins in said rails in the way of outward movement of said tie-rod ends.

2. A tire and wheel carrier comprising a cradle adapted to receive a wheel and tire mounted thereon, said cradle comprising a pair of U-shaped, spaced, longitudinal stringers for carrying said wheel and tire, a transverse tie-rod at each end of said cradle and having ends projecting laterally of said stringers, a beam fixed across the mid-portion of said cradle, a wheel-centering column mounted perpendicular to said beam to extend into engagement with the disc of said wheel for preventing lateral movement thereof, a stud-bolt and wing-nut fixed to the free end of said column, a disc engaging cap adapted to be mounted over said bolt and in engagement with said wheel for clamping said wheel, a pair of channel rails parallel to said stringers and adapted to receive said projecting ends of said tie-rods in sliding engagement and a pair of removable locking pins in said rails in the way of outward movement of said tie-rod ends.

3. A tire and wheel carrier comprising a cradle adapted to receive a wheel and tire of a certain diameter mounted thereon, said cradle comprising a pair of longitudinal stringers spaced at a distance less than said diameter for carrying said wheel and tire, a transverse tie-rod at each end of said cradle and having ends projecting laterally outwardly of said stringers, a wheel-centering column mounted on said cradle and including means extending upwardly beyond the level of said tie-rod into engagement with the disc of said wheel for preventing lateral movement thereof, and a pair of rails parallel to said stringers with wider spacing than that of said stringers but less than said diameter and adapted to receive said projecting ends of said tie-rods in sliding engagement, said rails being spaced vertically from said stringers a distance equal to the thickness of said tire.

4. A tire and wheel carrier comprising a cradle adapted to receive a wheel and tire of a certain diameter mounted thereon, said cradle comprising a pair of U-shaped, longitudinal stringers spaced at a distance less than said diameter for carrying said wheel and tire, a transverse tie-rod in the upper portion of each end of said cradle and having ends projecting laterally of said stringers, a beam fixed across the mid-portion of said cradle, a wheel-centering column mounted perpendicular to said beam to extend into engagement with the disc of said wheel for preventing lateral movement thereof, a pair of rails parallel to said stringers with wider spacing than that of said stringers but less than said diameter and adapted to receive said projecting ends of said tie-rods in sliding engagement, said rails being spaced vertically from said stringers a distance equal to the thickness of said tire, and removable locking means in said rails in the way of outward movement of said tie-rod ends.

PAUL C. BROWN.

REFERENCES CITED

The following references are of record in the file of this patent:

UNITED STATES PATENTS

| Number | Name | Date |
|---|---|---|
| 1,701,210 | Mach | Feb. 5, 1929 |
| 1,813,094 | Appel | July 7, 1931 |
| 2,016,955 | Bryant | Oct. 8, 1935 |
| 2,034,834 | Robinson, Jr. | Mar. 24, 1936 |
| 2,091,069 | Girl | Aug. 24, 1937 |
| 2,354,943 | Clark | Aug. 1, 1944 |
| 2,354,944 | Clark | Aug. 1, 1944 |
| 2,377,149 | Heil | May 29, 1945 |
| 2,547,083 | Lundgren | Apr. 3, 1951 |

FOREIGN PATENTS

| Number | Country | Date |
|---|---|---|
| 302,801 | Great Britain | Dec. 27, 1928 |